UNITED STATES PATENT OFFICE.

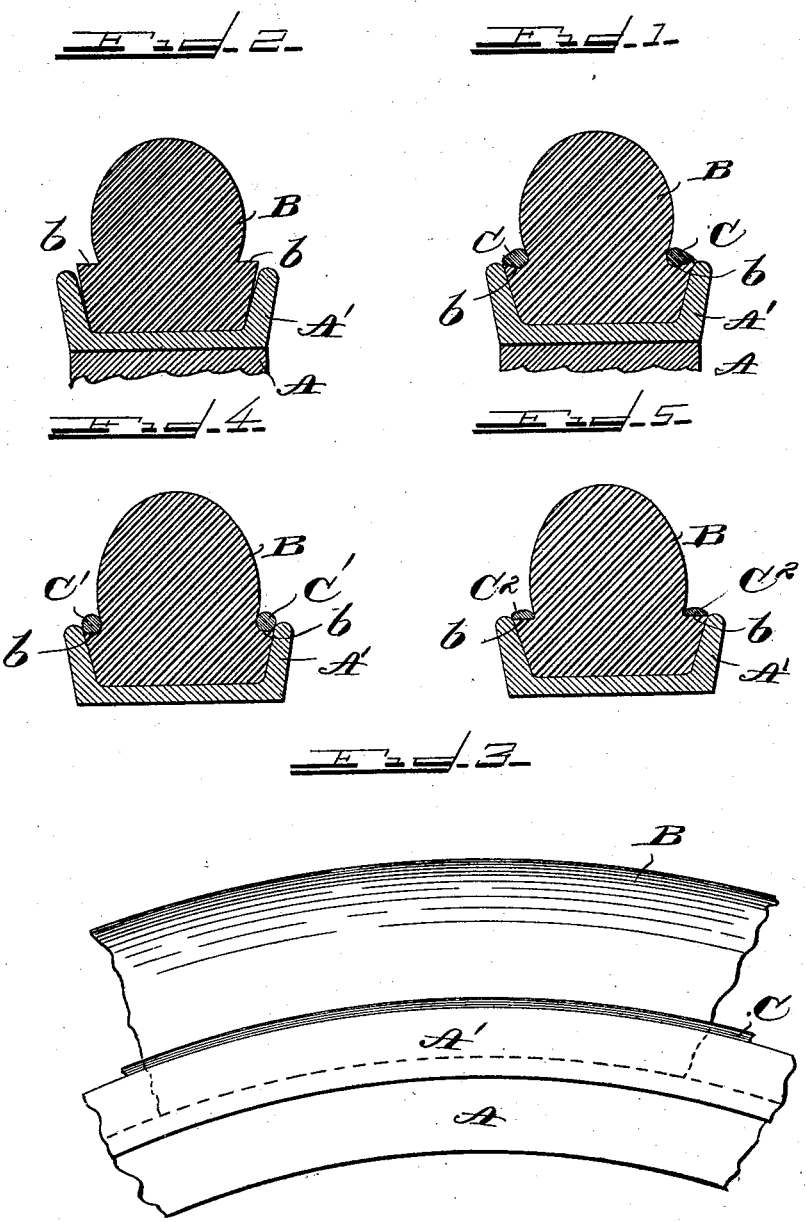

JOHN W. D. CARSLAW, OF CHICAGO, ILLINOIS, ASSIGNOR TO THE UNION TIRE AND RUBBER COMPANY, A CORPORATION OF ILLINOIS.

VEHICLE-TIRE.

SPECIFICATION forming part of Letters Patent No. 689,852, dated December 31, 1901.

Application filed August 27, 1900. Serial No. 28,123. (No model.)

*To all whom it may concern:*

Be it known that I, JOHN W. D. CARSLAW, a subject of the Queen of Great Britain, and a resident of Chicago, in the county of Cook and State of Illinois, have invented certain new and useful Improvements in Tires for Vehicles; and I do hereby declare that the following is a full, clear, and exact description thereof, reference being had to the accompanying drawings, and to the letters of reference marked thereon, which form a part of this specification.

My invention relates to improvements in cushion-tires for vehicles, and relates more particularly to means for securing a resilient tire to the wheel-rim, the object being to provide a cheap and effective construction having much greater durability than other constructions, inasmuch as the fastening devices cannot tear out, as has frequently occurred in other forms.

The invention consists in the matters hereinafter described, and more fully pointed out and defined in the appended claim.

In the drawings, Figure 1 is a cross-section of a tire embodying my invention. Fig. 2 is a similar cross-section illustrating the position of the shoulders on the cushion-strip before compression. Fig. 3 is a fragmentary side elevation of a tire embodying my invention. Figs. 4 and 5 are sections similar to Fig. 1 and illustrating modified forms of the clamping-band.

As shown in said drawings, A indicates the rim of the wheel. A' indicates a channel-iron strip secured circumferentially on said rim in any desired manner and adapted to engage between the side flanges of the same the cushion-tread B, of rubber or other suitable material.

$b\ b$ indicate shoulders on each side of the cushion-strip B, which before the compression of the tire within the channel-strip extend somewhat above the flanges of the channel-strip. C C' C² indicate, respectively, clamping-bands, preferably metallic, which engage said cushion-strip on said shoulders and are drawn tightly around the wheel, thereby compressing the inner portion of the cushion-strip, as indicated in Figs. 1, 4, and 5, and acting to retain the cushion-strip within said channel. The said cushion-strip may be of any desired form or shape. The inner side, however, is preferably formed to fit closely between the flanges of the channel-strip, with the shoulders on each side extending somewhat above the same and at their tops, as shown, forming flat contact-surfaces at right angles with the radius of the wheel. The clamping-bands may also be of any preferred form; but preferably each consists of a wire or metallic band rounded on its inner side to prevent cutting the cushion at the angle formed by the shoulder. Fig. 1 shows said band or wire as oval in cross-section. Fig. 4 shows the same as a cylindric wire, while Fig. 5 illustrates the same as a semicylindric band, having its flat side turned downwardly for contact with the flat contact-surface of the shoulder. Said clamping-bands may be put on in any desired manner to secure the desired compression of the resilient strip. Usually, however, the cushion-strip is placed in the channel-strip, as shown in Fig. 2, and the clamping bands or wires are placed around and in engagement each with a shoulder and on each side of the cushion-strip, thereby compressing the rubber to such an extent that the inner surface of the wire or band lies below the outer edge of the flange of the channel-strip on that side of the tire. The ends of said clamping-bands are then united by brazing, electric welding, or any other suitable or preferred means. Obviously when said strip is thus secured the radial compression of the rubber serves to press the same outwardly, completely filling the channel-strips, as indicated in Figs. 1, 4, and 5, thereby securing effective binding contact of the same therewith. At the same time, inasmuch as the inner surface of the clamping-bands falls below the periphery of the flanges, the clamping-bands cannot by any possibility slip over said flanges.

I claim as my invention—

A tire for vehicle-wheels comprising a channeled strip adapted to be secured circumferentially to the rim, a resilient strip of rubber or the like fitting closely within the channel and provided on each side with a groove forming a flat-topped shoulder extending around the tire the flat upper surface thereof being located normally above the side flanges of the channel-strip, an annular clamping-band oval in cross-section and of less diameter than the flanges of the channel-strip engaging each of said shoulders and acting to compress the rubber within said channel sufficiently to permit the inner side of said compressing-strip to lie below the flange edges of the channel said clamping-bands being sprung onto the tire by compressing the rubber below the tops of the flanges.

In testimony whereof I have hereunto subscribed my name in the presence of two subscribing witnesses.

JOHN W. D. CARSLAW.

Witnesses:
C. W. HILLS,
LOUIS J. DILSON.